(12) United States Patent
Decarreau et al.

(10) Patent No.: US 12,273,242 B2
(45) Date of Patent: Apr. 8, 2025

(54) SOLICITING AND PROVIDING DATA BASED ON DIVERSITY REQUIREMENTS FOR NETWORK APPARATUS

(71) Applicant: NOKIA TECHNOLOGIES OY, Espoo (FI)

(72) Inventors: Guillaume Decarreau, Munich (DE); Péter Szilágyi, Budapest (HU)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/260,811

(22) PCT Filed: Jan. 11, 2021

(86) PCT No.: PCT/EP2021/050367
§ 371 (c)(1),
(2) Date: Jul. 10, 2023

(87) PCT Pub. No.: WO2022/148550
PCT Pub. Date: Jul. 14, 2022

(65) Prior Publication Data
US 2024/0056362 A1 Feb. 15, 2024

(51) Int. Cl.
*H04L 41/14* (2022.01)

(52) U.S. Cl.
CPC .................. *H04L 41/145* (2013.01)

(58) Field of Classification Search
CPC ...... H04L 41/145; H04L 41/024; H04L 41/14; G06F 11/3006; G06F 11/3072; H04W 24/10
See application file for complete search history.

(56) References Cited

U.S. PATENT DOCUMENTS

2018/0150758 A1* 5/2018 Niininen ............... H04L 41/147
2020/0259700 A1* 8/2020 Bhalla .................... G06N 20/00

* cited by examiner

*Primary Examiner* — David R Lazaro
*Assistant Examiner* — Zia Khurshid
(74) *Attorney, Agent, or Firm* — Barta Jones, PLLC (57) ABSTRACT

There is provided a network apparatus configured to receive a request for data to be provided to an apparatus, the request comprising at least one diversity requirement for the requested data; solicit data using the at least one diversity requirement; receive the solicited data; and provide the solicited data to the apparatus.

13 Claims, 8 Drawing Sheets

SOLICITING AND PROVIDING DATA BASED ON DIVERSITY REQUIREMENTS FOR NETWORK APPARATUS

CROSS-REFERENCE TO RELATED APPLICATIONS

This application is a national phase entry of International Application No. PCT/EP2021/050367, filed Jan. 11, 2021, the contents of which are hereby incorporated by reference in their entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided a network apparatus comprising: means for receiving a request for data to be provided to an apparatus, the request comprising at least one diversity requirement for the requested data; means for soliciting data using the at least one diversity requirement; means for receiving the solicited data; and means for providing the solicited data to the apparatus.

The means for soliciting data may comprise means for sending the at least one diversity requirement to at least one data source.

The apparatus may comprise means for determining whether the solicited data complies with the at least one diversity requirement.

The means for providing the solicited data to the apparatus may provide the solicited data regardless of whether or not the solicited data complies with the at least one diversity requirement.

The means for providing the solicited data to the apparatus may only provide the solicited data when the means for determining determines that the solicited data complies with the at least one diversity requirement.

The apparatus may comprise means for continuing to solicit data using the at least one diversity requirement when the means for determining determines that the solicited data does not comply with the at least one diversity requirement.

The means for soliciting data using the at least one diversity requirement may comprise means for selecting at least one data source using the at least one diversity requirement and means for soliciting data from the selected at least one data source.

The means for soliciting data using the at least one diversity requirement may comprise means for retrieving and/or filtering data from a data store using the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a second aspect, there is provided an apparatus comprising: means for sending to a network apparatus a request for data to be provided to the apparatus, the request comprising at least one diversity requirement for the requested data; means for receiving data from the network apparatus in response to the request; and means for using the data for training a computational model.

The means for receiving data may receive data that is fully compliant with the at least one diversity requirement.

The means for receiving data may receive data that is not fully compliant with the at least one diversity requirement.

The means for receiving data may receive further data until all of the received data is fully compliant with the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a third aspect, there is provided at least one network apparatus comprising: at least one processor; and at least one memory including computer program code; the at least one memory and the computer program code being configured to, with the at least one processor, cause the network apparatus at least to: receive a request for data to be provided to an apparatus, the request comprising at least one diversity requirement for the requested data; solicit data using the at least one diversity requirement; receive the solicited data; and provide the solicited data to the apparatus.

The soliciting data may comprise sending the at least one diversity requirement to at least one data source.

The apparatus may be caused to determine whether the solicited data complies with the at least one diversity requirement.

The providing the solicited data to the apparatus may provide the solicited data regardless of whether or not the solicited data complies with the at least one diversity requirement.

The providing the solicited data to the apparatus may only provide the solicited data when the determining determines that the solicited data complies with the at least one diversity requirement.

The apparatus may be caused to continue to solicit data using the at least one diversity requirement when the determining determines that the solicited data does not comply with the at least one diversity requirement.

The soliciting data using the at least one diversity requirement may comprise selecting at least one data source using the at least one diversity requirement and soliciting data from the selected at least one data source.

The soliciting data using the at least one diversity requirement may comprise retrieving and/or filtering data from a data store using the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a fourth aspect, there is provided an apparatus comprising: at least one processor; and at least one memory including computer program code; the at least one memory and the computer program code being configured to, with the at least one processor, cause the apparatus at least to: send to a network apparatus a request for data to be provided to the apparatus, the request comprising at least one diversity requirement for the requested data; receive data from the network apparatus in response to the request; and use the data for training a computational model.

The receiving data may receive data that is fully compliant with the at least one diversity requirement.

The receiving data may receive data that is not fully compliant with the at least one diversity requirement.

The receiving data may receive further data until all of the received data is fully compliant with the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a fifth aspect, there is provided a method for a network apparatus, the method comprising: receiving a request for data to be provided to an apparatus, the request comprising at least one diversity requirement for the requested data; soliciting data using the at least one diversity requirement; receiving the solicited data; and providing the solicited data to the apparatus.

The soliciting data may comprise sending the at least one diversity requirement to at least one data source.

The method may comprise determining whether the solicited data complies with the at least one diversity requirement.

The providing the solicited data to the apparatus may provide the solicited data regardless of whether or not the solicited data complies with the at least one diversity requirement.

The providing the solicited data to the apparatus may only provide the solicited data when the determining determines that the solicited data complies with the at least one diversity requirement.

The method may comprise continuing to solicit data using the at least one diversity requirement when the determining determines that the solicited data does not comply with the at least one diversity requirement.

The soliciting data using the at least one diversity requirement may comprise selecting at least one data source using the at least one diversity requirement and soliciting data from the selected at least one data source.

The soliciting data using the at least one diversity requirement may comprise retrieving and/or filtering data from a data store using the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a sixth aspect, there is provided a method for an apparatus comprising: sending to a network apparatus a request for data to be provided to the apparatus, the request comprising at least one diversity requirement for the requested data; receiving data from the network apparatus in response to the request; and using the data for training a computational model.

The receiving data may receive data that is fully compliant with the at least one diversity requirement.

The receiving data may receive data that is not fully compliant with the at least one diversity requirement.

The receiving data may receive further data until all of the received data is fully compliant with the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a seventh aspect, there is provided a network apparatus comprising: receiving circuitry for receiving a request for data to be provided to an apparatus, the request comprising at least one diversity requirement for the requested data; soliciting circuitry for soliciting data using the at least one diversity requirement; receiving circuitry for receiving the solicited data; and providing circuitry for providing the solicited data to the apparatus.

The soliciting circuitry for soliciting data may comprise sending circuitry for sending the at least one diversity requirement to at least one data source.

The apparatus may comprise determining circuitry for determining whether the solicited data complies with the at least one diversity requirement.

The providing circuitry for providing the solicited data to the apparatus may provide the solicited data regardless of whether or not the solicited data complies with the at least one diversity requirement.

The providing circuitry for providing the solicited data to the apparatus may only provide the solicited data when the determining circuitry determines that the solicited data complies with the at least one diversity requirement.

The apparatus may comprise continuing circuitry for continuing to solicit data using the at least one diversity requirement when the determining circuitry determines that the solicited data does not comply with the at least one diversity requirement.

The soliciting circuitry for soliciting data using the at least one diversity requirement may comprise selecting circuitry for selecting at least one data source using the at least one diversity requirement and soliciting circuitry for soliciting data from the selected at least one data source.

The soliciting circuitry for soliciting data using the at least one diversity requirement may comprise retrieving circuitry for retrieving and/or filtering circuitry for filtering data from a data store using the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to an eighth aspect, there is provided an apparatus comprising: sending circuitry for sending to a network apparatus a request for data to be provided to the apparatus, the request comprising at least one diversity requirement for the requested data; receiving circuitry for receiving data from the network apparatus in response to the request; and using circuitry for using the data for training a computational model.

The receiving circuitry for receiving data may receive data that is fully compliant with the at least one diversity requirement.

The receiving circuitry for receiving data may receive data that is not fully compliant with the at least one diversity requirement.

The receiving circuitry for receiving data may receive further data until all of the received data is fully compliant with the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a ninth aspect, there is provided non-transitory computer readable medium comprising program instructions for causing a network apparatus to perform at least the following: receive a request for data to be provided to an apparatus, the request comprising at least one diversity requirement for the requested data; solicit data using the at least one diversity requirement; receive the solicited data; and provide the solicited data to the apparatus.

The soliciting data may comprise sending the at least one diversity requirement to at least one data source.

The apparatus may be caused to determine whether the solicited data complies with the at least one diversity requirement.

The providing the solicited data to the apparatus may provide the solicited data regardless of whether or not the solicited data complies with the at least one diversity requirement.

The providing the solicited data to the apparatus may only provide the solicited data when the determining determines that the solicited data complies with the at least one diversity requirement.

The apparatus may be caused to continue to solicit data using the at least one diversity requirement when the determining determines that the solicited data does not comply with the at least one diversity requirement.

The soliciting data using the at least one diversity requirement may comprise selecting at least one data source using the at least one diversity requirement and soliciting data from the selected at least one data source.

The soliciting data using the at least one diversity requirement may comprise retrieving and/or filtering data from a data store using the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to a tenth aspect, there is provided non-transitory computer readable medium comprising program instructions for causing an apparatus to perform at least the following: send to a network apparatus a request for data to be provided to the apparatus, the request comprising at least one diversity requirement for the requested data; receive data from the network apparatus in response to the request; and use the data for training a computational model.

The receiving data may receive data that is fully compliant with the at least one diversity requirement.

The receiving data may receive data that is not fully compliant with the at least one diversity requirement.

The receiving data may receive further data until all of the received data is fully compliant with the at least one diversity requirement.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements.

According to an eleventh aspect, there is provided a computer program comprising program instructions for causing a computer to perform any method as described above.

According to a twelfth aspect, there is provided a computer program product stored on a medium that may cause an apparatus to perform any method as described herein.

According to a thirteenth aspect, there is provided an electronic device that may comprise apparatus as described herein.

According to a fourteenth aspect, there is provided a chipset that may comprise an apparatus as described herein.

BRIEF DESCRIPTION OF FIGURES

Examples will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system are briefly explained with reference to FIG. 1.

Figure 1:
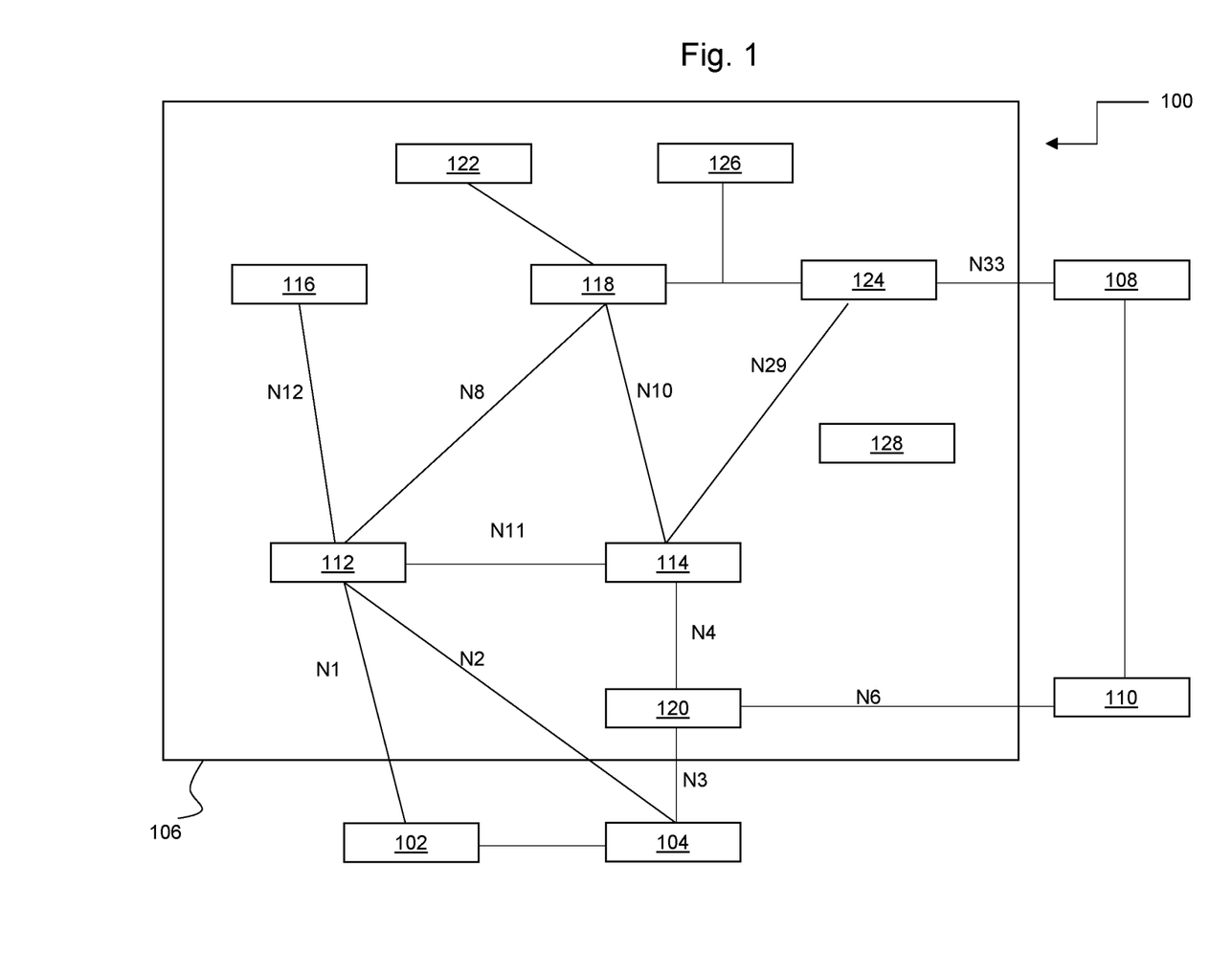
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5GC (5G Core network) has been defined as a Service Based Architecture (SBA). Service-Based Architectures provide a modular framework from which common applications can be deployed using components of varying sources and suppliers. Control plane functionality and common data repositories of a 5G network may thus be delivered by way of a set of interconnected Network Functions (NFs), each with authorization to access each other's services, with Network Function (NF) service producers exposing services to NF service consumers. NFs may act as service consumers and/or service providers. NF service providers register their NF profile in a Network Repository Function (NRF). An NRF maintains an updated repository of 5G elements available in the operator's network, along with the services provided by each of the elements in the 5G core that are expected to be instantiated, scaled and/or terminated without or minimal manual intervention. In other words, the NRF maintains a record of available NF instances and their supported services. The NRF allows other NF instances to subscribe and be notified of registrations from NF instances of a given type. The NRF may support service discovery, by receipt of Discovery Requests from NF instances and details which NF instances support specific services. Therefore NF Service consumers or Service Communication Proxies (SCP) (which obtain NF services on behalf of another network entity) may discover NF service producers by performing for example, an NF Discovery procedure towards the NRF.

In developing communication standards and protocols, various study items are produced. "Study on further enhancement for data collection" is a study Item that started in the Radio Access Network (RAN) Working Group in Q4 2020. It has an aim of studying data collection for Machine Learning/Artificial Intelligence (AI). Data may be collected in a communication network for a variety of purposes. For example, data may be collected to train a model for predicting network behaviour, in response to the predicted network behaviour, selecting optimal network changes/parameters for managing network resources. Data may also be collected for use with a trained model for selecting optimal network changes/parameters for managing network resource. The 3GPP Telecom Management working group, SA5, is also working on the issues associated with data collection/production in the Work Item, "Management data collection control and discovery".

In the current version of the 3GPP specification, data may be collected by making measurements using protocol-defined mechanisms. For example, it is possible for a measurement to be requested from a gNB using Minimization of Drive Test (MDT) or Performance Management mechanisms. The collected data can then be used for Machine Learning or Artificial Intelligence as described above. The Data Request for MDT can be UE specific (signalling-based) or area specific (management-based). This is described in more detail in 3GPP 37.320 for MDT stage 2. A simplified schematic of such a gNB is illustrated in FIG. 5.

Figure 5:
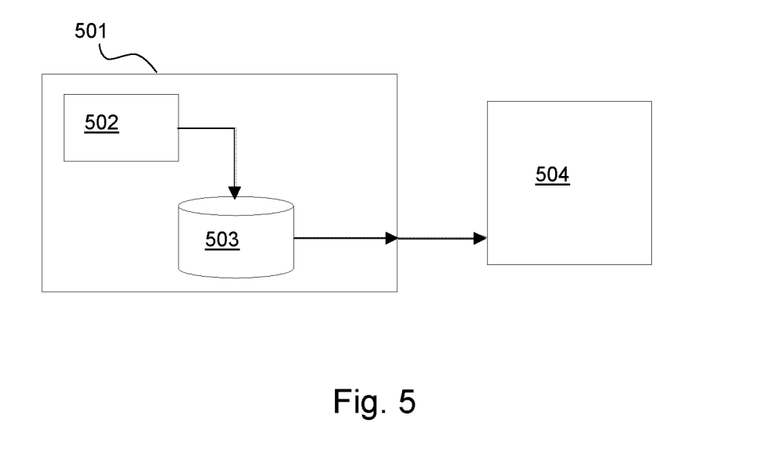
FIGS. 5 and 6 show example systems.

FIG. 5 shows a gNB 501 that comprises a data collection function 502 and storage 503 for storing collected data (which may be in raw and/or processed form). The gNB may be considered to be a specific example of a Data Provider, which is an entity in the network that collects data (and causes it to be stored in the network) for provision to a requesting entity. For example, the Data Provider may be an access point to a network (such as a gNB). As another example, the Data Provider may be an entity based within the network, such as a Trace and Collection Entity (TCE). The data storage 503 may provide the collected data to an AI entity 504.

In order to more accurately train the AI, the data should not be too strongly correlated.

One way of ensuring that data is not too strongly correlated is to collect a very large amount of data. This may be achieved, for example, by collecting data for a very long time, and/or collecting data for a large number of UE, and/or collecting data across a very large area. As one example of how this may be achieved, data relating to multiple/different UE moving patterns can be used for beam management decisions instead of the movement pattern of only a single UE. As another example, for a collection of data within an area that contains multiple cells, data for machine learning/training purposes may come from different cells.

However, a Data Provider (i.e. whichever entity in the network collects and causes data (such as measurements) to be stored in a network, such as a gNB or TCE) may find it difficult to store such a large amount of data. The Data Provider may also struggle with other resource issues associated with such operations, such as computational processor load. The collecting entities (e.g. the UEs) may also have limited battery power for collecting measurements for the Data Provider.

There is therefore a problem in such a system related to the amount of resources used relative to the usefulness of the collected data.

The following proposes to address at least one of the issues mentioned above by limiting what type of data is collected by a Data Provider.

In particular, the following proposes introducing at least one diversity metric into a Data Request message sent to the Data Provider. This at least one diversity metric may indicate how diverse the requested data should be.

The at least one diversity metric may depend on the type of data being requested and/or the type of measurement being made. For example, for an area, the diversity metric may specify how much percentage of the whole area should be covered. As another example, for a time-based requirement the diversity metric may specify that the data should be collected evenly per time unit. As another example, if a certain number of data sources are required, the diversity metric may specify that the data should not come from the same UE (e.g., specify a minimum number of different UEs from which data should be collected).

A breadth of the at least one diversity metric may be requested. For example, the Data Request may specify a minimum and/or maximum number of original sources of data, and/or a minimum and/or maximum geographical area the data sources should cover, and/or a minimum and/or maximum amount of time over which measurements are requested to be made. As an example, the Data Request may indicate multiple data collection intervals and how large data sample should be collected in each interval.

The received diversity metric may state its diversity requirement in at least one of a plurality of different forms, depending on exactly what is being measured and/or for what purpose.

For example, if the diversity metric relates to measurement values, the diversity requirement may indicate the number of samples per interval value. As another example, if Reference signal Receive Power (RSRP) is being measured, the diversity requirement may specify a number of values within particular dBm ranges, e.g. 10 sample in the range 0-10 dBm, 10 values in the range 10-20 dBm, etc. As an example when the diversity requirement relates to a time interval, the diversity requirement may specify a number of measurements per time interval. It is further understood that the diversity requirement may represent a mixture of different forms, e.g. be a mixture of the presently provided examples.

Multiple and different levels of diversity requirement(s) may also be specified in the received Data Request. In such a case, a Data Provider aims to provide data according to the most diverse request or according to the most important diversity factor that can be satisfied within the deadline given for the data collection. In other words, the requestor may give multiple levels of diversity to enable the Data Provider to autonomously evaluate which diversity requirement to satisfy during data collection. The inclusion of multiple levels of diversity requirement(s) in the Data Request may help to avoid renegotiation of diversity requirements between the Data Requester and the Data Provider, which helps to save network resources. The Data Request may indicate the most important diversity factor e.g., RSRP diversity/data/time. In other words, a Data Request comprising multiple levels of diversity requirements may be able to indicate a priority of at least one of those requirements relative to the other requirements.

For example, the Data Request may comprise a vector of diversity attributes, which if stated with values is addressed by the data producer. An initial vector may include three known diversity dimensions, e.g. minimum number of samples, minimum frequency of samples, minimum sources of samples (e.g. number of UEs). This generic structure may be configured such that the vector is extendable with extra diversity attributes when needed by the requesting application/client.

The Data Provider may be an access point to a network. For example, the Data Provider may be a gNB. The Data Provider may be another network-based entity. For example, the Data Provider may be a TCE. The Data Provider may collect data that's been gathered internally, and/or data that's been produced by at least one UE and signalled to the Data Provider.

The entity sending the Data Request (also referred to herein as the "requester") may have different diversity constrains for different measurements. For example, the request may indicate diversity in RSRP and a location.

The requester may indicate a deadline to the Data Provider to complete the Data Request. If the Data Provider is unable to gather the data with the requested diversity before the deadline expires, the data collection may stop. Further, the data collected so far may be still provided to the requester but also include an indication that the data does not satisfy the specified diversity requirement(s).

It may also be possible to deliver data continuously from the Data Provider to the Data Requestor.

Figure 6:
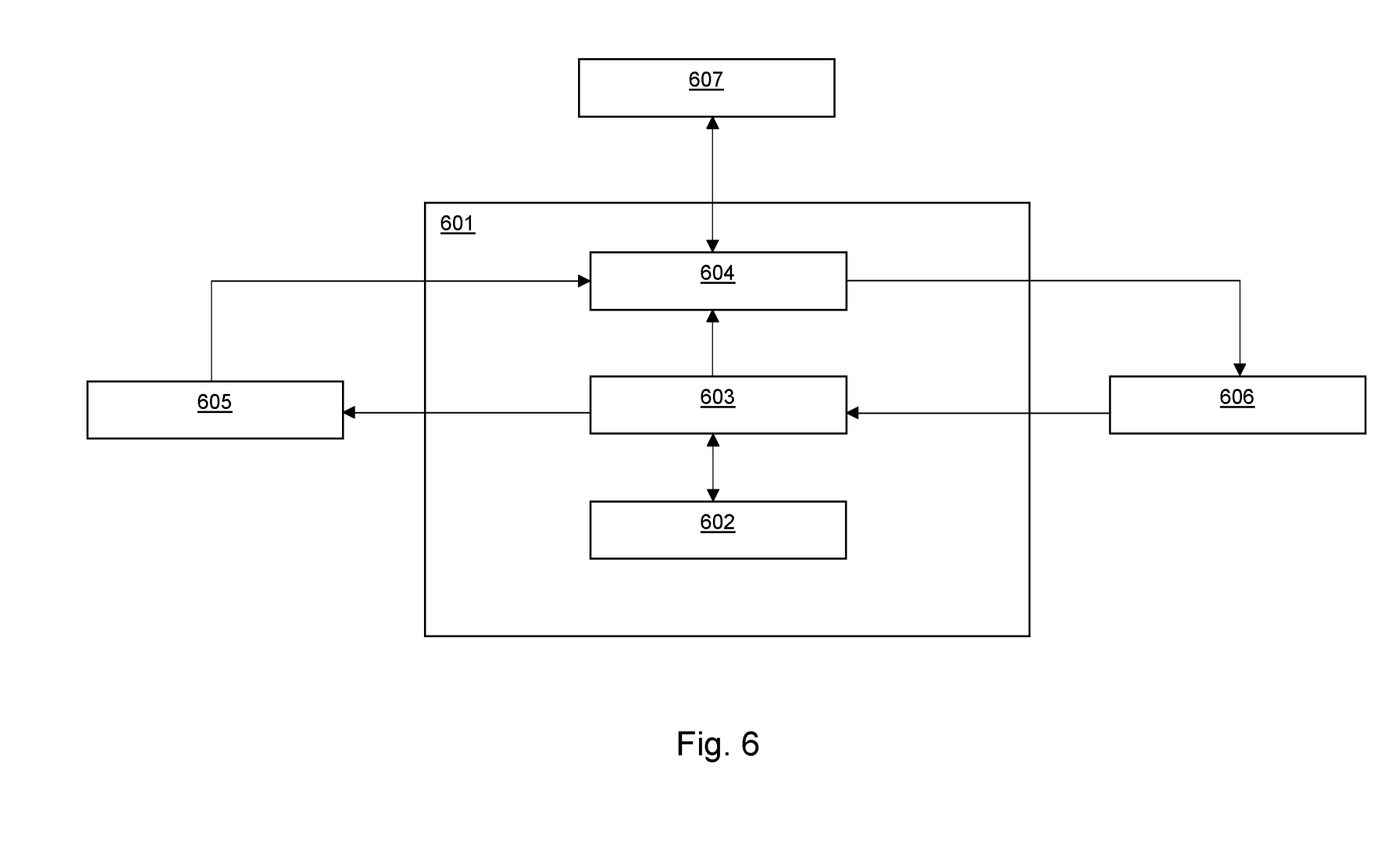

Although the presently described mechanism may be applied in the simple system illustrated in FIG. 6, it may similarly be applied via a programmable data collection framework. The functional architecture of a potential data collection framework is shown in FIG. 6.

FIG. 6 shows a Data Management Framework 601 for a Data Provider comprising a Data Repository 602, a Messaging Framework 603 and a Data Collection Coordination Function 604 (DCCF). The Data Repository 602 may exchange signals with the Messaging Framework 603. The Messaging Framework 603 may interface with an external Data Consumer 605 using a consumer adaptor for collecting data. It is understood that this consumer adaptor may be provided at the Messaging Framework 603, at the Data Consumer 605, or may be standalone. Messaging Framework 603 may interface with DCCF 604 over a DCCF adaptor for coordinating request and data delivery. Messaging Framework 603 may interface with an external Data Source 606 via a producer adaptor for collecting data. It is understood that this producer adaptor may be provided at the Messaging Framework 603, provided at the Data Source 606, or may be standalone.

The DCCF 604 may also interface with the Data Source 605 for requesting that data be provided to the Messaging Framework 603. The DCCF 604 may interface with a 5G core networkfunction 607 such as, for example, an NRF, a UDM and/or a Binding Support Function (BSF). The DCCF 604 may interface with the Data Consumer 605 for receiving requests for data from the Data Consumer (e.g. Subscribe operations). The DCCF 604 may, in response to a request for data, select the Data Source 606 for providing the requested data and direct a request for that data to the Data Source 606. The DCCF 604 may also identify the 5G core network function 607 that serves the Data Consumer/UE 605 making the Data Request. The DCCF 604 may further control data replication and consolidate subscription/Data Requests received from different Data Consumers 605.

The scope of the data collection framework is to enable the collection and distribution of any data (operational, trace, event, MDT, Control plane, Management plane, etc., except for the User-plane Protocol Data Unit (PDU) session data) from sources to consumers. Data sources may be dynamically discovered by the framework based on the requests of Data Consumers. A Messaging Framework may be used to efficiently distribute data from Data Sources to Data Consumers, so that a Data Source does not need to replicate data towards its potential multiple Data Consumers. This means that Data Sources may not be aware of the location and identity of their Data Consumers as this is handled by the framework. The Data Collection and Coordination Function (DCCF) may control the Data Sources and Data Consumers: it exposes available data to potential Data Consumers, receives request for data from Data Consumers, triggers the production of data at Data Sources, and dynamically configures the Message Framework to route & replicate data from Data Sources to Data Consumers. The DCCF itself does not handle data but it is aware of the bindings between Data Sources and Data Consumers.

Figure 7:
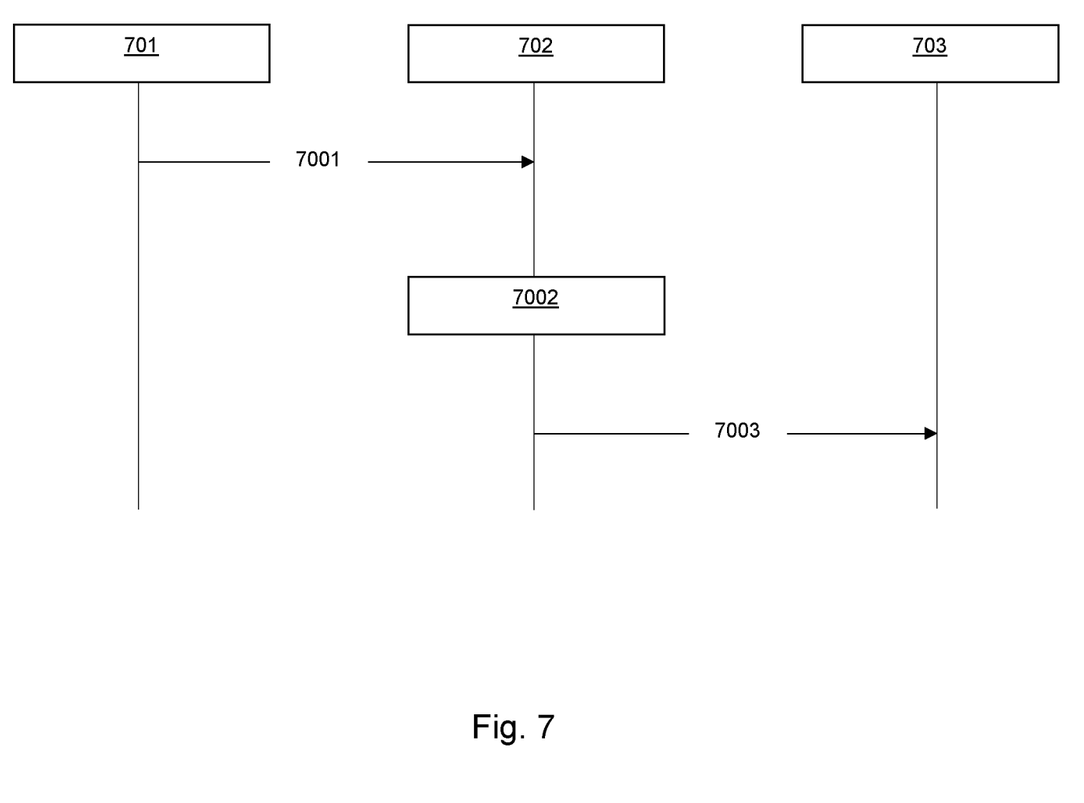
FIG. 7 shows an example signalling diagram.

FIG. 7 illustrates an example signal mechanism between a Data Requestor 701, a Data Provider 702 and a Data Consumer 703.

At 7001, the Data Requestor 701 sends a Data Request to the Data Provider 702. The Data Request may comprise at least one diversity requirement as described herein.

At 7002, the Data Provider 702 collects the requested data while attempting to comply with the received at least one diversity requirement. The Data Provider 702 may be a Radio Access Network node, such as a gNB, or another entity in the network, such as a TCE.

At 7003, the Data Provider 702 delivers the collected data to the Data Consumer 703. The collected data may be delivered when a minimum diversity requirement of the at least one received diversity requirements has been received.

Figure 8:
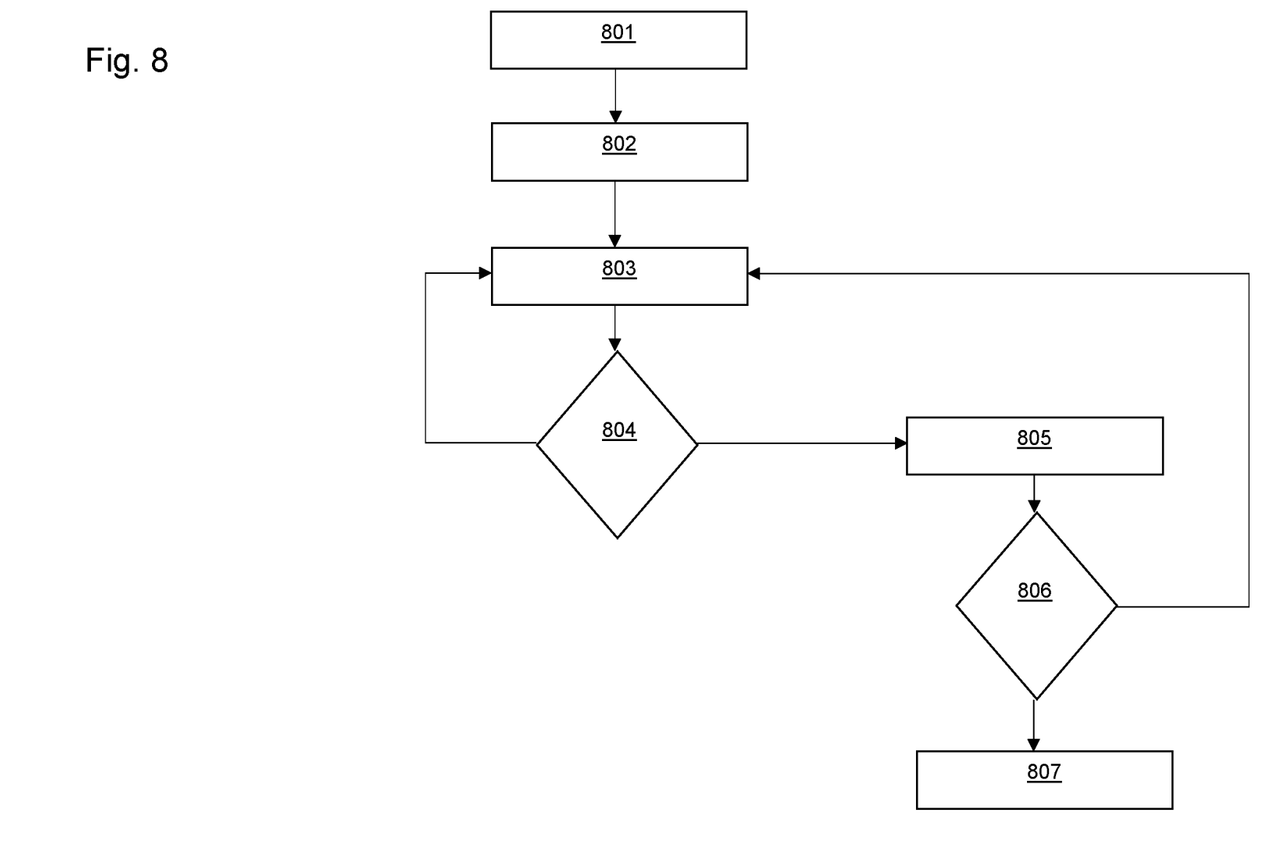
FIG. 8 shows an example flow signalling diagram.

FIG. 8 shows a flow chart illustrating potential steps that may be performed in the presently described mechanism, where a UE is a data source and a gNB is a Data Provider. It is understood that the presently described mechanism is not limited to these example apparatuses.

At 801, the gNB receives a Data Request comprising at least one diversity requirement. The Data Request may be received from an AI application/AI client.

At 802, the gNB configures at least one UE to perform and/or provide measurements.

At 803, the gNB receives measurements from at least one of the UE(s) configured at 802.

At 804, the gNB determines whether it has collected enough UE measurements to fulfil at least one of the received diversity requirements. When the gNB determines that it has not collected enough UE measurements to fulfil at least one of the received diversity requirements, the process may return to 803. When the gNB determines that it has collected enough UE measurements to fulfil at least one of the received diversity requirements, the gNB proceeds to 805.

At 805, the gNB stores the measurements received at 803. It is understood that, as a variant, the gNB may, instead of storing the received data in 805, send the partial data to the Data Requestor. This may help mitigate storage space issues at the gNB, especially when multiple results are being provided.

At 806, the gNB determines whether it has fully complied with the Data Request. When the gNB determines that it has not fully complied with the Data Request, the gNB may return to 803. When the gNB determines that it has fully complied with the Data Request, the gNB may proceed to 807.

At 807, the gNB returns a response to the Data Request of 801 with data obtained during steps 803 to 805.

Different levels of diversity requirements may be included in the Data Request. For example, if one diversity requirement is labelled as level 1 and another as level 2, there may be an assumption that level 2 includes level 1 (and so if level 2 is achieved, so is level 1). Level 2 may indicate a stricter requirement than level 1. For example, in terms of a number of data sources being a diversity requirement, level 1 can be 10 data sources and level 2 can be 20 data sources. In such a case, the Data Provider may first try to achieve a level 1 goal and, when that goal is achieved, instead of sending the results to the original requestor (e.g. at step 807), the Data Provider may instead continue obtaining data until the level 2 requirement is fulfilled.

Figure 9:
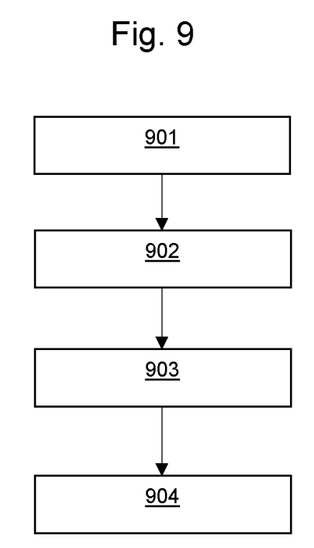
FIGS. 9 and 10 are flow charts illustrating potential operations that may be performed by example apparatuses.
Figure 10:
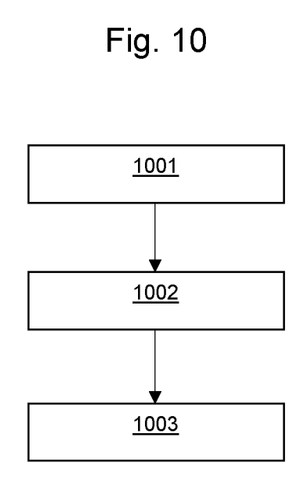

FIGS. 9 and 10 are flow charts illustrating potential operations that may be performed when implementing aspects of the presently described system.

FIG. 9 illustrates steps that may be performed by a Data Provider. The Data provider may be, for example, a network-based entity, such as a gNB or a TCE. However, it is understood that this is not limiting as any entity that is able to coordinate data provision for a client may usefully perform the following steps.

At 901, the Data Provider receives a request for data to be provided to an apparatus. The apparatus may be an entity that requests the data on behalf of an AI client. In other words, the request may be made by a Data Consumer based on an application. The apparatus may be, for example, network-based. The apparatus may be, for example, a user equipment/terminal. The request comprises at least one diversity requirement for the requested data.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements. For example, the request may comprise at least two diversity requirements from the list in the preceding paragraph. The request may comprise more than two of the diversity requirements listed in the preceding paragraph.

At 902, the Data Provider solicits data using the at least one diversity requirement.

The data may be solicited in any of a plurality of different ways. For example, the Data Provider may already have access to data complying with the data request received in 901. In such a case, the Data Provider may solicit the data in response to the request by retrieving it from an associated memory (i.e. a data storage accessible to the Data Provider). Therefore, soliciting data using the at least one diversity requirement may comprise retrieving and/or filtering data from a data store using the at least one diversity requirement.

As another example, the Data Provider may solicit data in response to the request by sending a request for data to at least one other entity. For example, the Data Provider may ask another entity to provide data complying with the diversity requirement. As another example, the Data Provider may select several data sources/entities and request data from them that complies with at least part of the diversity request. To illustrate, in the case of the diversity requirement specifying a number of user equipments for receiving data from, the Data Provider may solicit data from at least that number of user equipments. Therefore, soliciting data using the at least one diversity requirement may comprise selecting at least one data source using the at least one diversity requirement and soliciting data from the selected at least one data source.

In both examples, the Data Provider may be said to solicit data by sending the at least one diversity requirement to at least one data source, where the data source is data storage and/or a data collection entity. The Data Provider may combine mechanisms for soliciting data to attempt to obtain data complying with the at least one diversity requirement. Therefore, soliciting data using the at least one diversity requirement may comprise selecting at least one data source using the at least one diversity requirement and soliciting data from the selected at least one data source.

At 903, the Data Provider receives the solicited data.

At 904, the Data Provider provides the solicited data to the apparatus.

The Data Provider may determine whether the solicited data complies with the at least one diversity requirement. The solicited data may be provided to the apparatus regardless of whether or not the solicited data complies with the at least one diversity requirement. This may be performed, for example, in response to determining that at least a threshold time has passed since the request of 901 was received. This may be performed, for example, in response to determining that the Data Provider has a threshold amount of data storage left. The solicited data may be only provided the solicited data when the Data Provider determines that the solicited data complies with the at least one diversity requirement.

The Data Provider may continue to solicit data using the at least one diversity requirement when the Data Provider determines that the solicited data does not comply with the at least one diversity requirement.

FIG. 10 illustrates potential operations that may be performed by an apparatus interacting with the Data Provider of FIG. 9. The apparatus may be an entity that requests the data on behalf of an AI client. The apparatus may be, for example, network-based. The apparatus may be, for example, a user equipment/terminal.

A 1001, the apparatus may send, to a network apparatus, a request for data to be provided to the apparatus. This request may correspond to the request received by the Data Provider at 901. The request comprises at least one diversity requirement for the requested data.

The at least one diversity requirement may be at least one of: a maximum number of sources of data; a minimum number of sources of data; a maximum geographical area sources of data should cover; a minimum geographical area sources of data should cover; a maximum amount of time over which measurements are requested to be made; and a minimum amount of time over which measurements are requested to be made.

The request for data to be provided to an apparatus may comprise multiple diversity requirements. For example, the request may comprise at least two diversity requirements from the list in the preceding paragraph. The request may comprise more than two of the diversity requirements listed in the preceding paragraph.

At 1002, the apparatus receives data from the network apparatus in response to the request. The received data may be fully compliant with the at least one diversity requirement. The received data may not be fully compliant with the at least one diversity requirement (e.g. in the case that the Data Provider simply forwards the requested data regardless of whether it fully complies with the diversity requirement). The apparatus may continue to receive further data until all of the received data is fully compliant with the at least one diversity requirement.

At 1003, the apparatus uses the data for training a computational model. This training may be performed by the AI application client. The AI application client may be resident on the apparatus. The AI application client may simply access a network through the apparatus (and may thus not be resident on the apparatus). In other words, the using the data for training a computational model may include causing that data to be used for training a computational model when the AI application client is not resident on the apparatus. The computational model may, once trained, be used for predicting network behavior and/or determining a mode of operation for at least one entity using the network to communicate.

The above described mechanism may have a plurality of advantages over current systems. For example, it may help to ensure a better training set by obtaining data that is not too strongly correlated and may thus explore a wider range of values. Moreover, the above described mechanisms may also ensure that issues with storing and/or delivering large amounts of data may be avoided. Where multiple diversity requirements (including a preferred requirement) are indicated in a same Data Request, this may help avoid renegotiations of diversity between the requester and the Data Provider.

Figure 2:
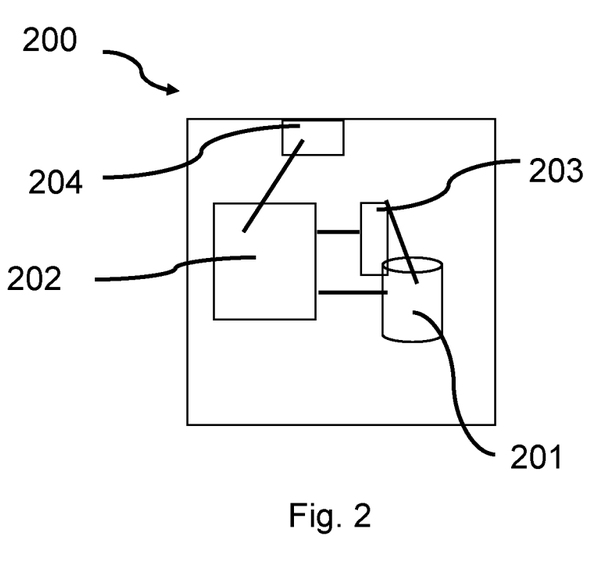
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
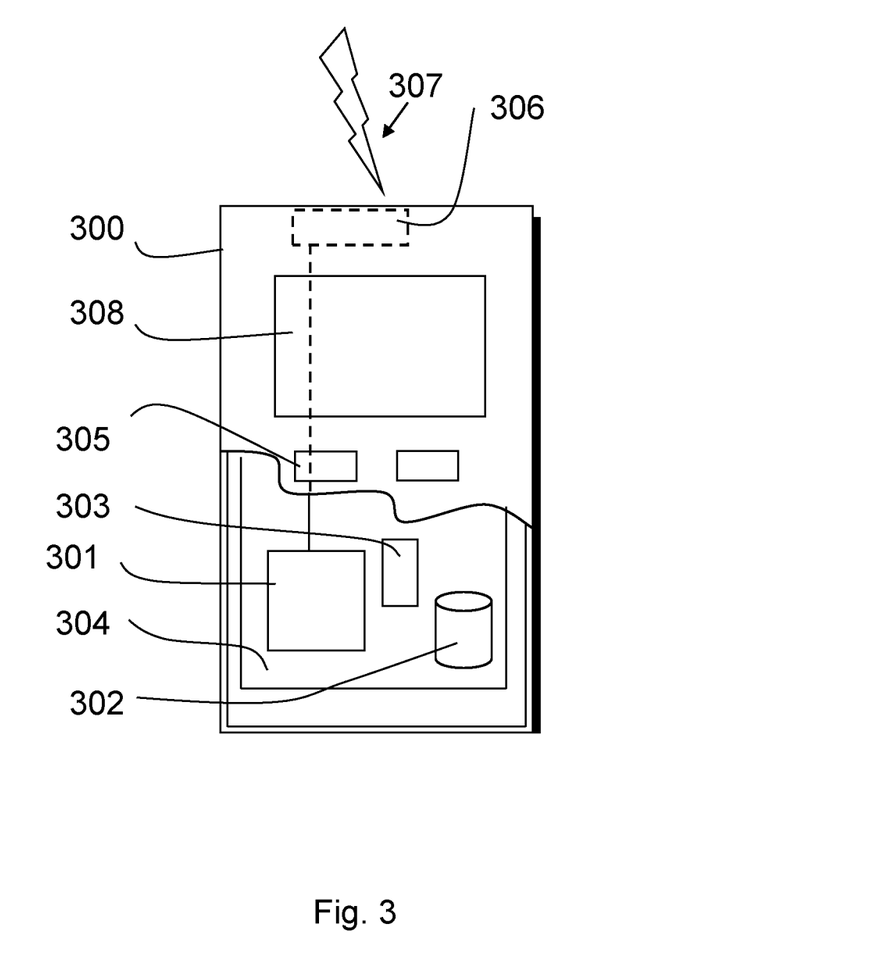
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
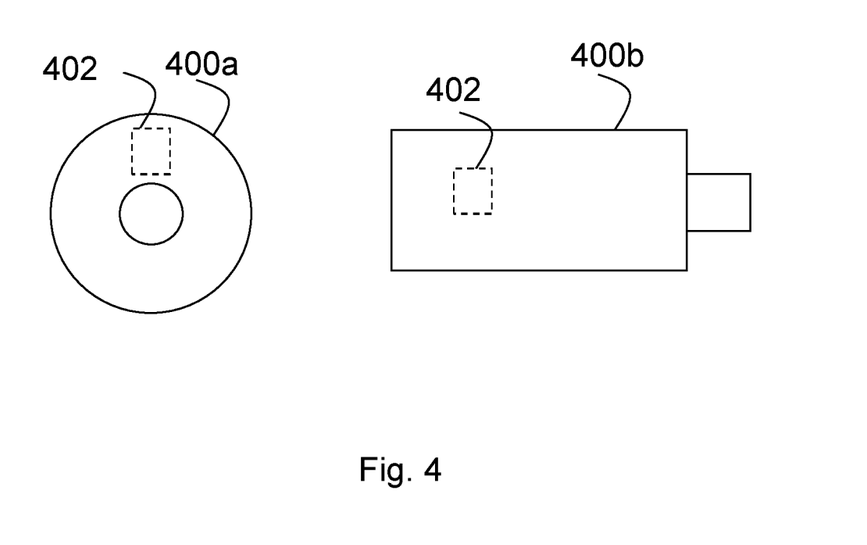
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 10.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
- (a) hardware-only circuit implementations (such as implementations in only analogue and/or digital circuitry);
- (b) combinations of hardware circuits and software, such as:
  - (i) a combination of analogue and/or digital hardware circuit(s) with software/firmware and
  - (ii) any portions of hardware processor(s) with software (including digital signal processor(s)), software, and memory(ies) that work together to cause an apparatus, such as the communications device or base station to perform the various functions previously described; and
- (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. A network apparatus comprising:
   at least one processor; and
   at least one memory including computer program code, the at least one memory and the computer program code being configured to, with the at least one processor, cause the network apparatus at least to perform:
   receiving a request for data to be provided to an apparatus for training a computational model, the request specifying multiple diversity requirements for the data, the multiple diversity requirements including a minimum number of data sources, a minimum geographical area that the data sources should cover, and a minimum amount of time over which measurements are to be taken;
   selecting at least one data source according to the multiple diversity requirements and soliciting the data from the at least one data source, wherein the soliciting of the data from the at least one data source comprises sending the multiple diversity requirements to the at least one data source and retrieving and filtering retrieved data from the at least one data source using the multiple diversity requirements; and
   providing the retrieved data to the apparatus.

2. A network apparatus as claimed in claim 1, wherein the at least one memory and the computer program code are further configured to, with the at least one processor, cause the network apparatus to determine whether the retrieved data complies with the multiple diversity requirements.

3. A network apparatus as claimed in claim 2, wherein the providing of the retrieved data to the apparatus comprises providing the retrieved data regardless of whether or not the retrieved data complies with the multiple diversity requirements.

4. A network apparatus as claimed in claim 2, wherein the providing of the retrieved data comprises providing the retrieved data to the apparatus only when the retrieved data is determined to comply with the multiple diversity requirements.

5. A network apparatus as claimed in claim 2, wherein the at least one memory and the computer program code are further configured to, with the at least one processor, cause the network apparatus to continue to solicit the data using the multiple diversity requirements when that the retrieved data is determined to not comply with the multiple diversity requirements.

6. An apparatus comprising:
   at least one processor; and
   at least one memory including computer program code, the at least one memory and the computer program code being configured to, with the at least one processor, cause the apparatus at least to perform:
   sending to a network apparatus a request for data to be provided to the apparatus, the request specifying multiple diversity requirements for the data, the multiple diversity requirements including a minimum number of data sources, a minimum geographical area that the data sources should cover, and a minimum amount of time over which measurements are to be taken, the request for data further including, for each of the multiple diversity requirements, a first level requirement and a second level requirement, wherein the second level requirement specifies a stricter requirement that specifies a higher level of data diversity than the first level requirement;
   receiving data from the network apparatus in response to the request; and
   using the data for training a computational model.

7. An apparatus as claimed in claim 6, wherein the receiving of the data from the network apparatus comprises receiving data that is fully compliant with the multiple diversity requirements.

8. An apparatus as claimed in claim 6, wherein the receiving of the data from the network apparatus comprises receiving data that is not fully compliant with the multiple diversity requirements.

9. An apparatus as claimed in claim 8, wherein the receiving of the data further comprises receiving further data until all of the received data and the further data is fully compliant with the multiple diversity requirements.

10. A method for a network apparatus, the method comprising:
    receiving a request for data to be provided to an apparatus for training a computational model, the request specifying multiple diversity requirements for the data, the multiple diversity requirements including a minimum number of data sources, a minimum geographical area that the data sources should cover, and a minimum amount of time over which measurements are to be taken;
    selecting at least one data source according to the multiple diversity requirements and soliciting data from the at least one data source, wherein the soliciting of the data from the at least one data source comprises sending the multiple diversity requirements to the at least one data source and retrieving and filtering retrieved data from the at least one data source using the multiple diversity requirements; and providing the data that was retrieved and filtered to the apparatus.

11. A method for an apparatus, the method comprising:
sending to a network apparatus a request for data to be provided to the apparatus, the request specifying multiple diversity requirements for the data, the multiple diversity requirements including a minimum number of data sources, a minimum geographical area that the data sources should cover, and a minimum amount of time over which measurements are to be taken, the request for data further including, for each of the multiple diversity requirements, a first level requirement and a second level requirement, wherein the second level requirement specifies a higher level of data diversity than the first level requirement;
receiving data from the network apparatus in response to the request; and
using the data for training a computational model.

12. A non-transitory computer readable medium comprising program instructions for causing an apparatus to perform at least the following:
receiving a request for data to be provided to an apparatus for training a computational model, the request specifying multiple diversity requirements for the data;
selecting at least one data source according to the multiple diversity requirements and soliciting data from the at least one data source, wherein the soliciting of the data from the at least one data source comprises sending the multiple diversity requirements to the at least one data source and retrieving and filtering retrieved data from the at least one data source using the multiple diversity requirements; and
providing the retrieved data to the apparatus.

13. A non-transitory computer readable medium comprising program instructions for causing an apparatus to perform at least the following:
sending to a network apparatus a request for data to be provided to the apparatus, the request specifying multiple diversity requirements for the requested data, the multiple diversity requirements including a minimum number of data sources, a minimum geographical area that the data sources should cover, and a minimum amount of time over which measurements are to be taken, the request for data further including, for each of the multiple diversity requirements, a first level requirement and a second level requirement, wherein the second level requirement specifies a stricter requirement that specifies a higher level of data diversity than the first level requirement;
receiving data from the network apparatus in response to the request; and
using the data for training a computational model.

* * * * *